US009322274B2

(12) United States Patent
Knob

(10) Patent No.: US 9,322,274 B2
(45) Date of Patent: Apr. 26, 2016

(54) ROTARY PISTON INTERNAL COMBUSTION ENGINE

(71) Applicant: Vaclav Knob, Brevnov (CZ)

(72) Inventor: Vaclav Knob, Brevnov (CZ)

(73) Assignee: KNOB ENGINES S.R.O., Phara 6 (CZ)

( * ) Notice: Subject to any disclaimer, the term of this patent is extended or adjusted under 35 U.S.C. 154(b) by 267 days.

(21) Appl. No.: 14/085,427

(22) Filed: Nov. 20, 2013

(65) Prior Publication Data

US 2014/0137836 A1 May 22, 2014

(30) Foreign Application Priority Data

Nov. 22, 2012 (CZ) ................................ PV 2012-820

(51) Int. Cl.

| | |
|---|---|
| ***F01B 13/04*** | (2006.01) |
| ***F02B 57/00*** | (2006.01) |
| ***F16J 1/24*** | (2006.01) |
| ***F01C 19/02*** | (2006.01) |
| ***F02B 57/08*** | (2006.01) |
| *F01B 1/06* | (2006.01) |
| *F02B 75/22* | (2006.01) |
| *F02B 75/18* | (2006.01) |

(52) U.S. Cl.

CPC ................. *F01C 19/02* (2013.01); *F01B 13/04* (2013.01); *F02B 57/08* (2013.01); *F01B 1/06* (2013.01); *F02B 75/222* (2013.01); *F02B 2075/1812* (2013.01)

(58) Field of Classification Search

CPC .... F01B 1/06; F02B 57/08; F02B 2075/1812; F02B 75/222; F01C 19/02

USPC ..................................... 123/43 R, 44 R, 45 R

See application file for complete search history.

(56) References Cited

U.S. PATENT DOCUMENTS

| | | | | |
|---|---|---|---|---|
| 4,401,062 A * | 8/1983 | Dean | F02B 57/08 | 123/44 D |
| 5,123,394 A * | 6/1992 | Ogren | F01B 9/04 | 123/44 D |
| 5,524,577 A * | 6/1996 | Clifford | F01B 13/061 | 123/44 D |

FOREIGN PATENT DOCUMENTS

| | | |
|---|---|---|
| DE | 2153946 A | 5/1973 |
| DE | 2732779 A | 2/1979 |
| DE | 2767156 A | 2/1999 |

* cited by examiner

*Primary Examiner* — Thai Ba Trieu
*Assistant Examiner* — Deming Wan
(74) *Attorney, Agent, or Firm* — Andrew Wilford

(57) ABSTRACT

A rotary-piston internal-combustion engine comprises a rotating block with three radially situated cylinders with pistons and an outside placed stationary case with two intake ports and two exhaust ports. Between the rotating block and the stationary case there are sealing parts and connecting rods, connected to one crank pin of a crankshaft. Between the crankshaft and the rotating block there is gearing for three times higher revolutions of the crankshaft in the opposite direction with respect to the rotating block. In the stationary case there are at least two spark plugs placed on the opposite sides. The bore of cylinders is 2 to 3.5 times higher than the stroke of pistons and all sealing parts with pressure springs that seal spaces of cylinders to the outer stationary case are placed in cavities in the stationary case.

3 Claims, 4 Drawing Sheets

ROTARY PISTON INTERNAL COMBUSTION ENGINE

FIELD OF THE INVENTION

The present invention relates to a rotary-piston internal-combustion engine.

BACKGROUND OF THE INVENTION

An internal-combustion engine is known that consists of a rotating block of a rotational shape, with radially situated cylinders with pistons. Outside the rotating cylinder block there is a stationary case with intake and exhaust ports and so the rotational cylinder block together with the stationary case work like a rotary valve. Pistons are connected with a crankshaft by means of connecting rods. The crankshaft rotates at different revolutions than the rotating cylinder block and they are coupled by means of gearing.

There are known designs of two, three and multi cylinder arrangements of engines with rotating block of the rotational shape with radially situated cylinders with pistons. Outside this rotating cylinder block there is a stationary case with intake and exhaust ports. The rotating cylinder block serves as a rotary valve at the same time. Pistons are connected with the engine crankshaft by means of any of known mechanisms for converting straight movement of a piston to the rotating one of a crankshaft. The engine crankshaft is coupled with the rotating cylinder block by means of gearing. None of those designs has achieved wider enlargement and utilization despite the undoubted potential.

There are many reasons why these engines were not successful. These engines were designed with usual bore/stroke ratio and the engine dimensions were then too large. Rotation of a big block is then problematic in terms of high inertia forces, deformation of the big outer stationary case, cylinder cooling etc. Another negative feature of these designs was the seal between the rotating block and the stationary case. The cylinder space was mostly sealed to the stationary case by a seal, which was placed in the rotating cylinder block. This seal was then exposed to centrifugal forces that are caused by rotation of the cylinder block. That seal was consequently more loaded, there were high friction losses and lubrication problems. Such designs are described e.g. in patents DE2732779, DE2153946A1 or FR2767156A1.

SUMMARY OF THE INVENTION

The above-mentioned deficiencies are removed to a large extent in a rotary-piston internal-combustion engine with a rotating block with three radially situated cylinders with pistons and an outside placed stationary case with two intake and two exhaust ports, while three connecting rods are connected to an one-pin crankshaft and between the crankshaft and rotating block there is gearing with a gear ratio $N_{crankshaft}/N_{block}=-3$, and in the stationary case there are at least two spark plugs and/or two injection nozzles placed on the opposite sides. The essence is that the bore/stroke ratio is 2 to 3.5 and all sealing parts that seal cylinder space to the outer stationary case, i.e. side and transverse sealing parts, are placed in grooves in the outer stationary engine case and sit down on the outer surface of the rotating block.

All three connecting rods have a forked big-end eye, while two connecting rods are asymmetrical, identical and they fit into each other and the third connecting rod is wider, symmetrical and all of them are placed on one sleeve, which is revolvably placed on a single crank pin.

The rotary-piston internal-combustion engine has advantageously pistons with holes in the piston walls for conducting the oil away and the rotating cylinder block has cavities for cooling oil.

The engine can consist of multiples of three-cylinder engine units, while it can be advantageously provided with one shared gearing between the rotating block and engine crankshaft, which has the same number of crank pins as the number of multiples of three-cylinder engine units.

The rotary-piston internal-combustion engine enables the 4-stroke cycle work without using lifting valves. Cross-sectional areas of exhaust and intake ports are large, they open and close relatively quickly and they enable to maximally fill the cylinder, maximally utilize the expansion and minimize flow losses in ports, even at high engine speeds. The compression ratio can be adjusted arbitrarily. There are no obstructing lifting valves with high temperature in the combustion chamber. That improves the resistance to knocking. It is possible to place more spark plugs in the combustion chamber and so ensure optimal combustion even with high cylinder bore diameter and at high engine speeds. The combustion chamber can be made in any shape by shaping the piston crown. Any anti-detonation slots can be also created. It is also possible and advantageous to create any shape of the piston and port with respect to combustion chamber scavenging at the end of exhaust and beginning of intake. The engine can be well balanced. It is a rotating star three cylinder engine, indeed.

Smaller outer diameter of the rotating block is achieved thanks to high bore/stroke ratio and minimal length of connecting rods. That leads to small outer dimensions of the engine, better utilization of inner space and small weight. Small dimensions of the rotating block and relatively low speed of the rotating block with respect to the crankshaft allow to reach relatively small sliding velocities at the seal on the perimeter of the rotating block.

Thanks to placing the sealing parts of the rotating block in the stationary case, there are neither centrifugal nor any other inertia forces acting on them. That decreases lubrication demands as well as mechanical losses by friction of those parts and improve their durability and reliability.

That is a significant advantage of the rotary-piston internal-combustion engine over the Wankel rotary engine. Compared to the Wankel engine it also have a better seal thanks to multiple sealing parts of the rotary block and planar contact of sealing parts, a better shape of the combustion chamber, higher attainable compression, easier manufacturing and repair.

It is possible to reach very high engine speed with this rotary piston engine due to minimization of dimensions of the rotary block, decrease of friction velocities at its perimeter and due to the fact that the sealing parts of the rotating block are not loaded by inertia forces. The engine therefore achieves higher specific performance and weight parameters due to the higher achievable engine speeds.

The rotary-piston internal-combustion engine uses a standard crankshaft mechanism with pistons and piston rings, which is perfect in terms of design and technology.

When using the rotary engine as an aircraft engine there is an advantage in small gyroscopic moment of this engine, because the rotating cylinder block revolves in the opposite direction than the engine crankshaft. It is advantageous to use the rotating cylinder block to drive the propeller, because the rotating cylinder block rotates at three times smaller speed than the engine crankshaft.

This piston rotary engine will enable realization of a simple, production-cheap four-stroke combustion engine of small dimensions, with small number of moving parts, with balanced and silent working and high specific performance.

BRIEF DESCRIPTION OF THE DRAWINGS

The rotary-piston internal-combustion engine according to the invention will be clarified on a model engine by means of enclosed drawings. Therein.

DETAILED DESCRIPTION OF THE INVENTION

Figure 1:
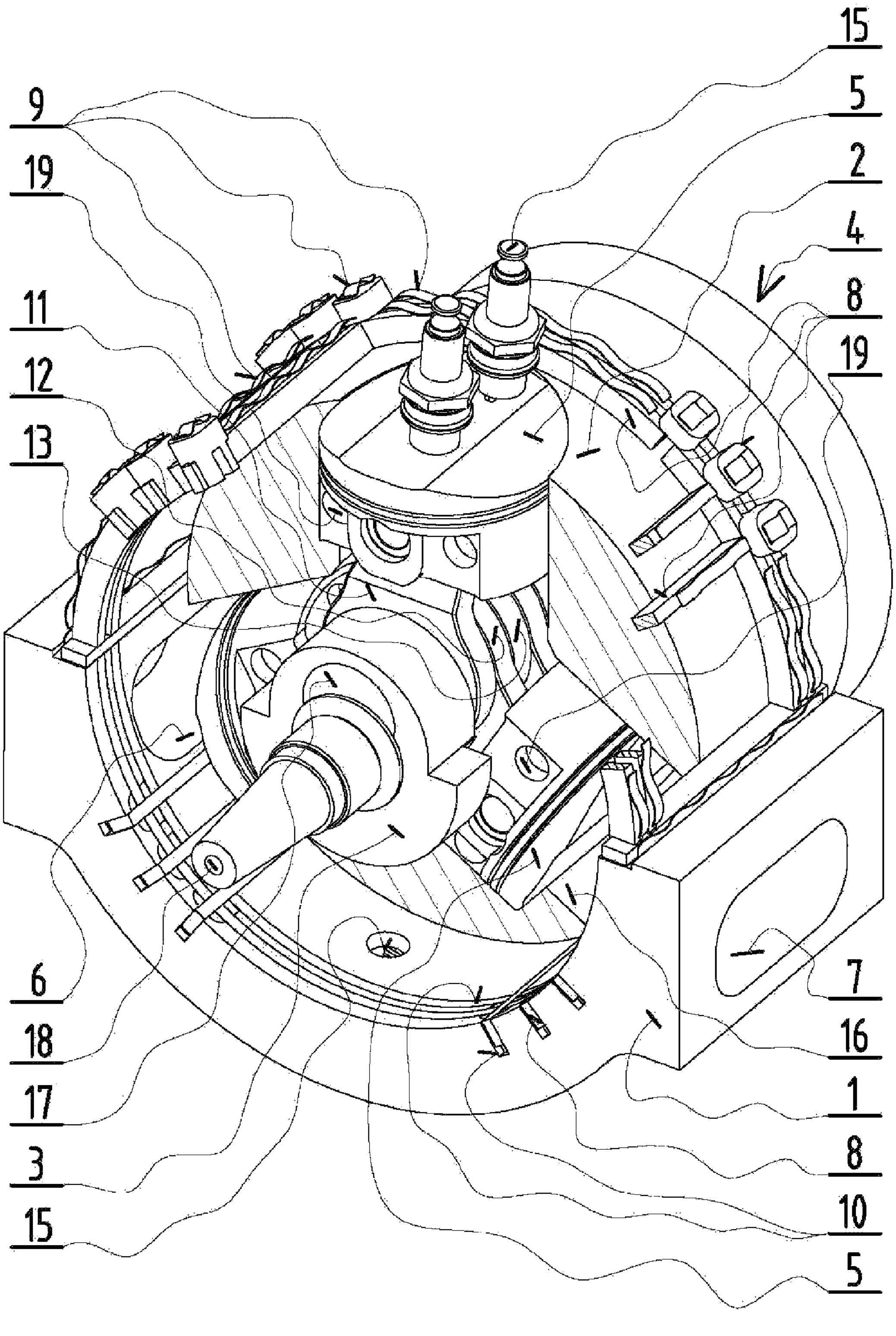
FIG. 1 is an axonometric view of a rotary piston combustion engine with a removed part of the stationary case and with the rotating block in a cross-sectional view (section plane is taken through cylinder axes).
Figure 2:
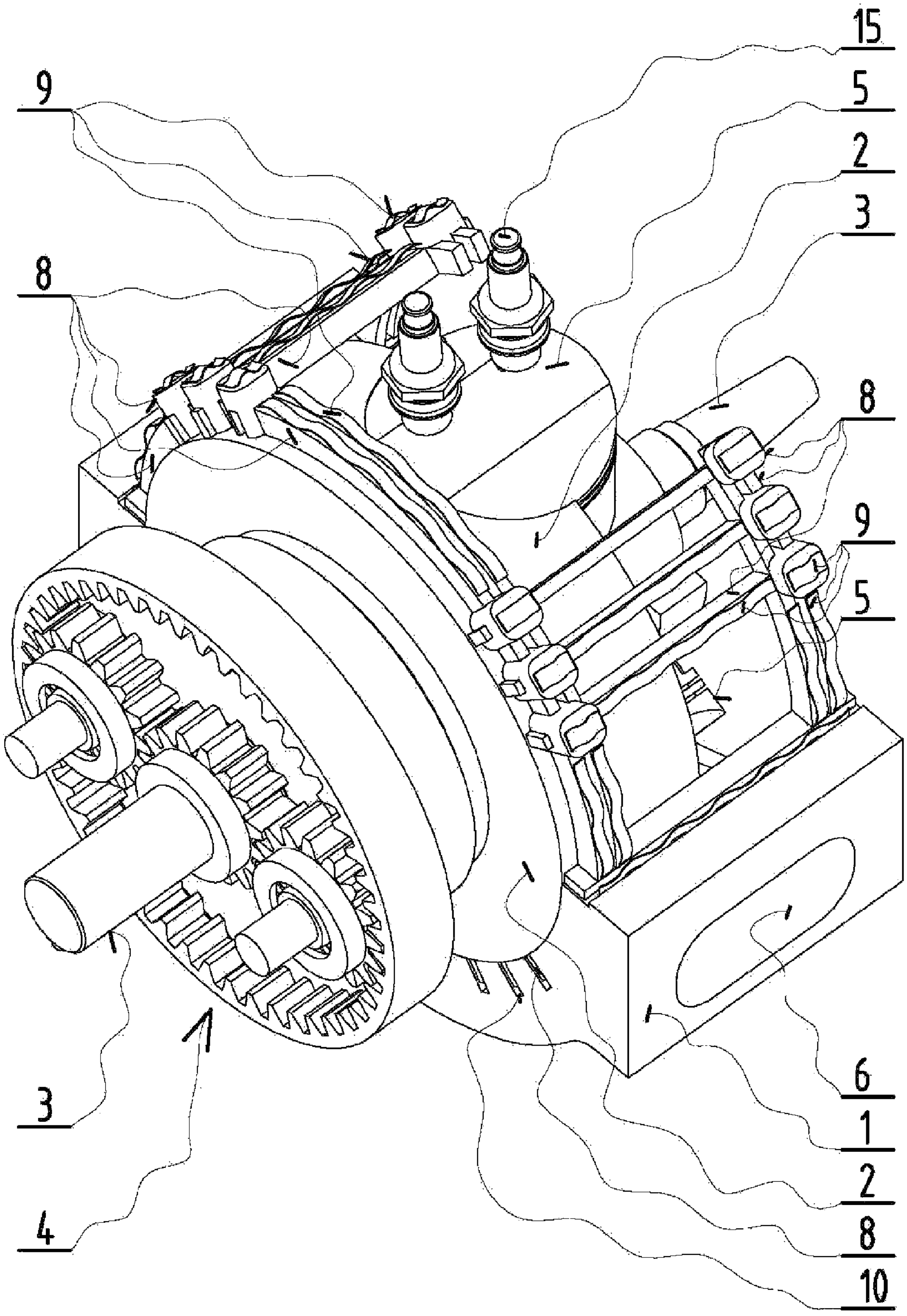
FIG. 2 is an axonometric view of the rotary piston combustion engine according to the FIG. 1 showing the gearing between the rotating block and the crankshaft.

The model rotary-piston internal-combustion engine according to the FIG. 1 and FIG. 2 comprises a stationary case 1, in which a rotating block 2 with three radially situated cylinders 16 and pistons 5 is placed. The stationary case 1 is equipped with two intake ports 6 and two exhaust ports 7. Connecting rods 11, 12, 13 are connected to one crank pin 17 of a crankshaft 3 and between the crankshaft 3 and the rotating block 2 there is gearing 4 with gear ratio $N_{crankshaft}/N_{block}=-3$. In the stationary case 1 there are at least two spark plugs 15 placed on the opposite sides. The crankshaft 3 has a lubricating duct 18 and pistons 5 have holes 19 in walls for conducting the lubricating and cooling oil away. In this particular example the cylinder bore 16 is 2.63 times larger than the stroke of the piston 5 and all sealing parts 8 with pressure springs 9 are placed in cavities 10 in the stationary case 1. The outer diameter of the rotating block 2 is in this case only 2.5 times higher than the cylinder bore 16 and for this case and for an engine of displacement 750 cm3 the diameter is 230 mm.

Figure 3:
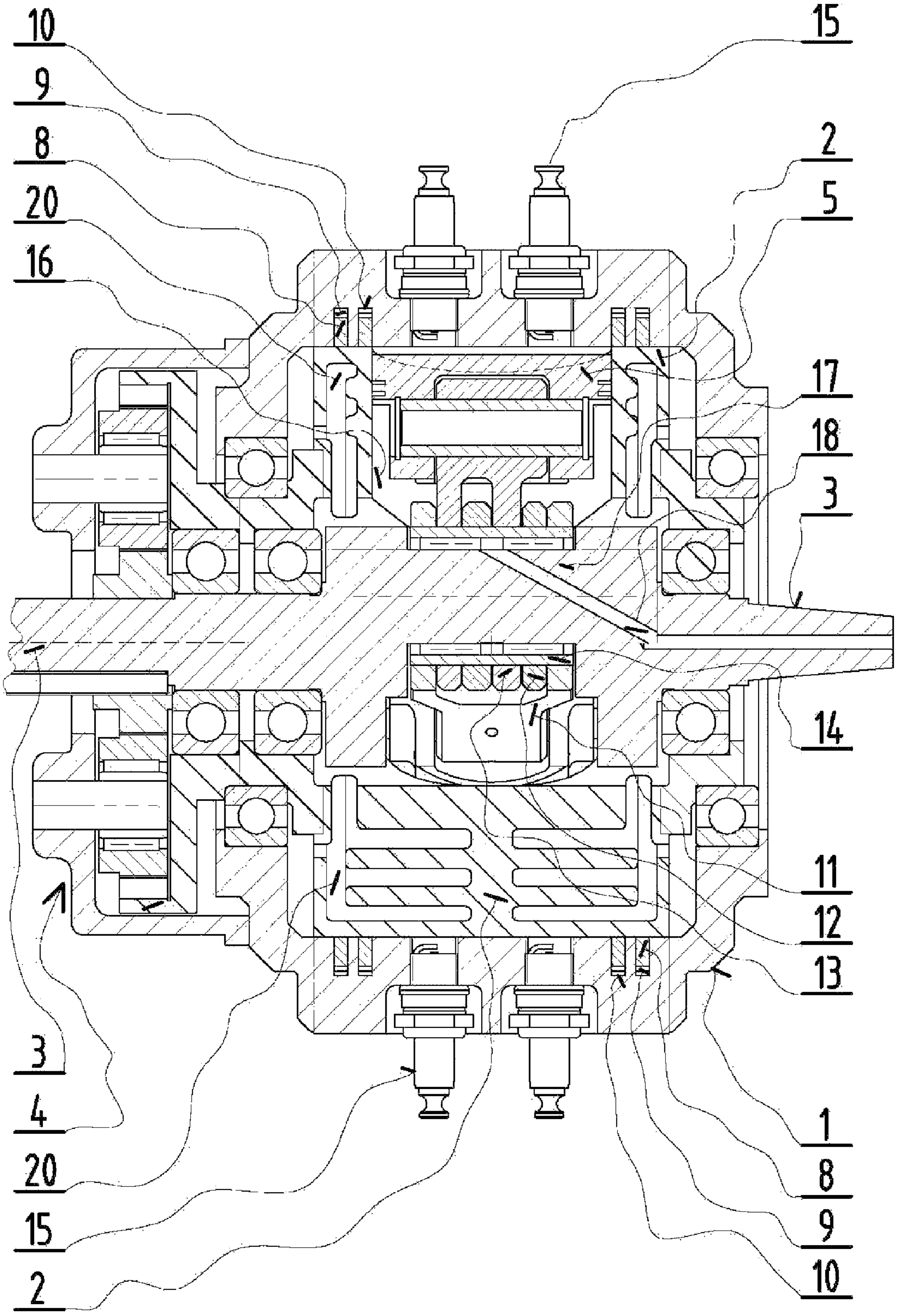
FIG. 3 is a cross-sectional view of the rotary piston engine taken longitudinally through the axis of rotation.

The embodiment of the rotary-piston internal-combustion engine according to the FIG. 3 is the same as that one according to the FIG. 1. All three connecting rods 11, 12, 13 are placed on one sleeve 14 and they have a forked big-end eye, while connecting rods 12 and 13 are asymmetrical, identical and they fit in each other. The third connecting rod is wider and symmetrical. The shared sleeve 14 is revolvably placed on a crank pin 17. In the rotating block 2 there are cavities 20 for cooling oil.

Figure 4:
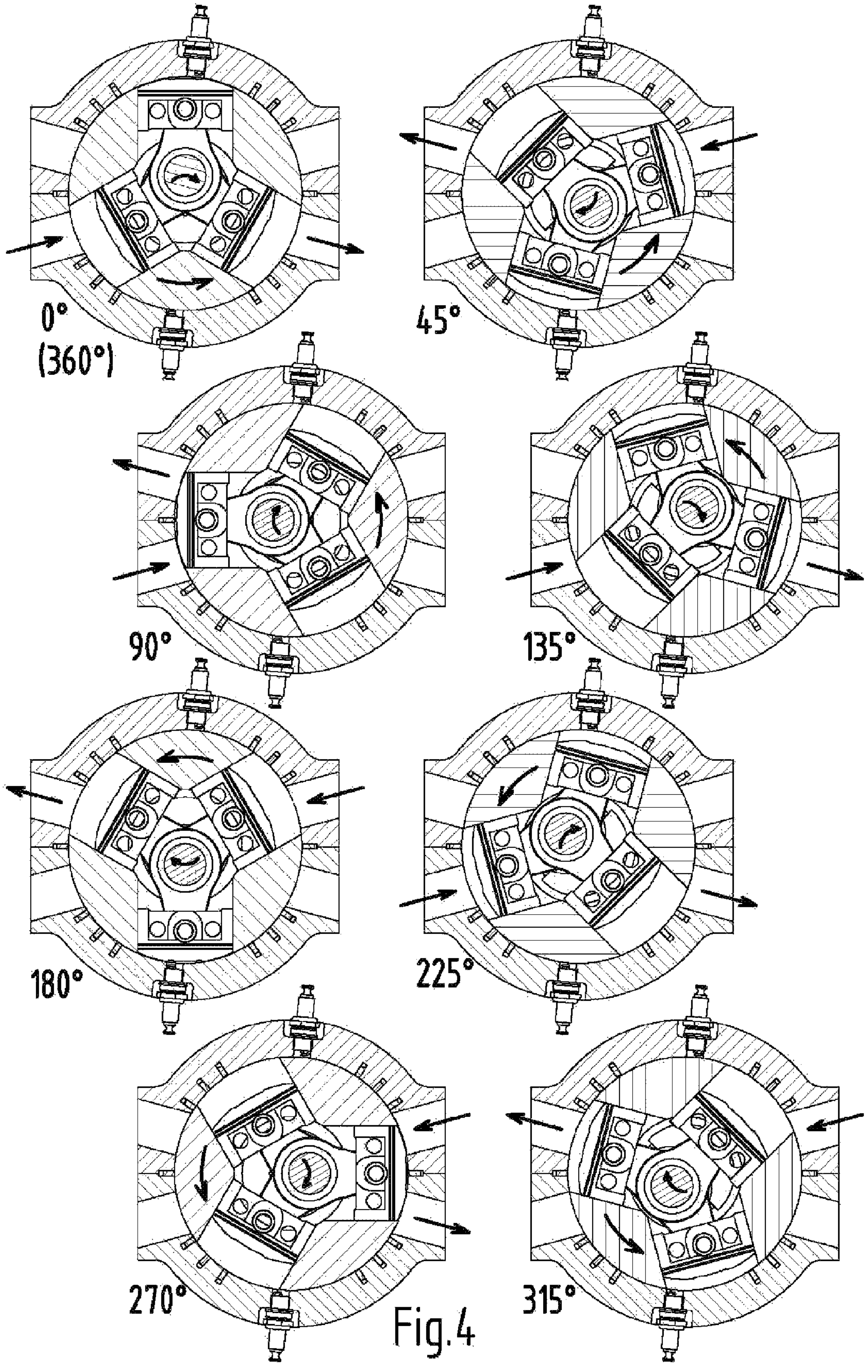
FIG. 4 schematically shows working of the rotary-piston internal-combustion engine during one revolution of the rotating block in eight sequences. At every position there is written the angle of turn of the rotating block, while the angle of turn of the crankshaft is opposite and three times higher.

The function of the rotary piston combustion engine is following. While turning the crankshaft, the engine works in a standard 4-stroke cycle. The piston 5 draws fresh charge into the cylinder 16 from the intake port 6, then there is compression, ignition by a spark plug 15, expansion and consequent exhaust into the exhaust port 7. The whole cycle is done during 0.5 revolution of the rotating block 2. In the meantime the crankshaft 3 does 1.5 revolutions in the opposite direction and the relative motion between the crankshaft 3 and the rotating block 2 then accounts for two whole revolutions, which are necessary for a 4-stroke cycle. The working of the engine is schematically shown in the FIG. 4. The motion of the rotating block 2 is done by means of gearing 4 between the crankshaft 3 and the rotating block 2 with gearing ratio Ncrankshaft/Nblock=−3. The rotating block 2 serves as a rotary valve in the stationary case 1, while the cylinder bore orifice 16 in the rotating block 2 gradually opens and closes the intake port 6 and later it opens and closes the exhaust port 7. The sealing parts 8 pressed by pressing springs 9 sit down on the rotating block 2 and they seal the cylinder space 16 with higher pressure. At the ignition time, when the pressure is the highest, there is advantageously more sealing parts between the cylinder bore orifice 16 and the intake port 6 and the exhaust port 7. Those several sealing parts ensure very good sealing of the cylinder space 16. It is advantageous, when all three connecting rods 11, 12, 13 have a forked big-end eye, because then all of them have a stable seating on one sleeve 14 and axes of cylinders 16 can be in one plane. Connecting rods 12 and 13 have then an asymmetrically forked big-end eye and they fit in each other. The connecting rod 11 has a wide symmetrical forked big-end eye around connecting rods 12 and 13. The sleeve 14 has large contact area for the bearing on the crank pin 17. That is advantageous for its load capacity and durability. Oil can be brought to the piston space 5 by a duct 18 in the crankshaft 3 and it has a lubricating and cooling function. High ratio of cylinder 16 bore to piston 5 stroke results in large area of pistons 5 that can be cooled by this oil. Short stroke of pistons 5 decreases heat transfer to cylinder walls 16. Pistons 5 can have holes 19 in their walls, through which the oil can be conducted away from the piston 5 space to cooling cavities 20 in the rotating block 2 at the bottom dead center. Cooling of the stationary case 1 is advantageously done classically by water. The power can be outputted from the crankshaft 3 or from the rotating block 2 or from both simultaneously. The rotary-piston internal-combustion engine can consist of multiples of three-cylinder units of the engine, while the shared rotating block 2 is turned by one shared gearing 4 between the rotating block 2 and the crankshaft 3.

INDUSTRIAL APPLICABILITY

The rotary-piston internal-combustion engine according to the invention can be used for e.g. driving small aircrafts, motorcycles, racing cars and in other applications, where high performance and small weight and dimensions of an engine are of primary interest. Thanks to its simplicity and small dimensions it can be also used for driving standby generators etc. Provided that the lubricating oil consumption is significantly limited it is possible to consider application in conventional vehicles or hybrid vehicles. The engine is basically suitable for running on hydrogen or other alternative gaseous fuels.

I claim:

1. A rotary-piston internal-combustion engine comprising:

a stationary case formed with two intake ports and two exhaust ports and with a plurality of cavities;

a block rotatable about an axis in the case and formed with first, second, and third radially extending cylinders;

respective first, second, and third pistons each radially reciprocal through a displacement of the piston in the cylinders, the cylinders each having a diameter that is 2 to 3.5 times greater than the displacement of the pistons;

respective seals and springs in the cavities between the rotating block and the stationary case;

a crankshaft rotatable in the case at the axis and having a single crank pin;

respective first, second, and third connecting rods between the crank pin of the crankshaft and the pistons and each having a forked big-eye end, the first and second connecting rods being asymmetrical and fitting into each other and the third connecting rod being symmetrical;

gearing between the crankshaft and the rotary block for three times higher revolutions of the crankshaft in a opposite direction that of the rotating block;

at least two spark plugs on opposite sides of the stationary case; and one sleeve on which all of the connecting rods are journaled and that is rotationally mounted on the crank pin.

2. The rotary-piston internal-combustion engine defined in claim 1, wherein each piston is provided with a respective hole for conducting cooling oil away from the piston and the rotating block is provided with passages into which the hole in the piston opens for the cooling oil.

3. The rotary-piston internal-combustion engine assembly comprising a predetermined plural number of the engines as defined in claim 1, the gearing between the rotating block and the crankshaft being shared by the engines and the crankshaft having a number of crank pins equal to the predetermined number.

* * * * *